(No Model.) 2 Sheets—Sheet 2.
H. HELLAND & F. MATZOW.
APPARATUS FOR STAMPING ENVELOPES.

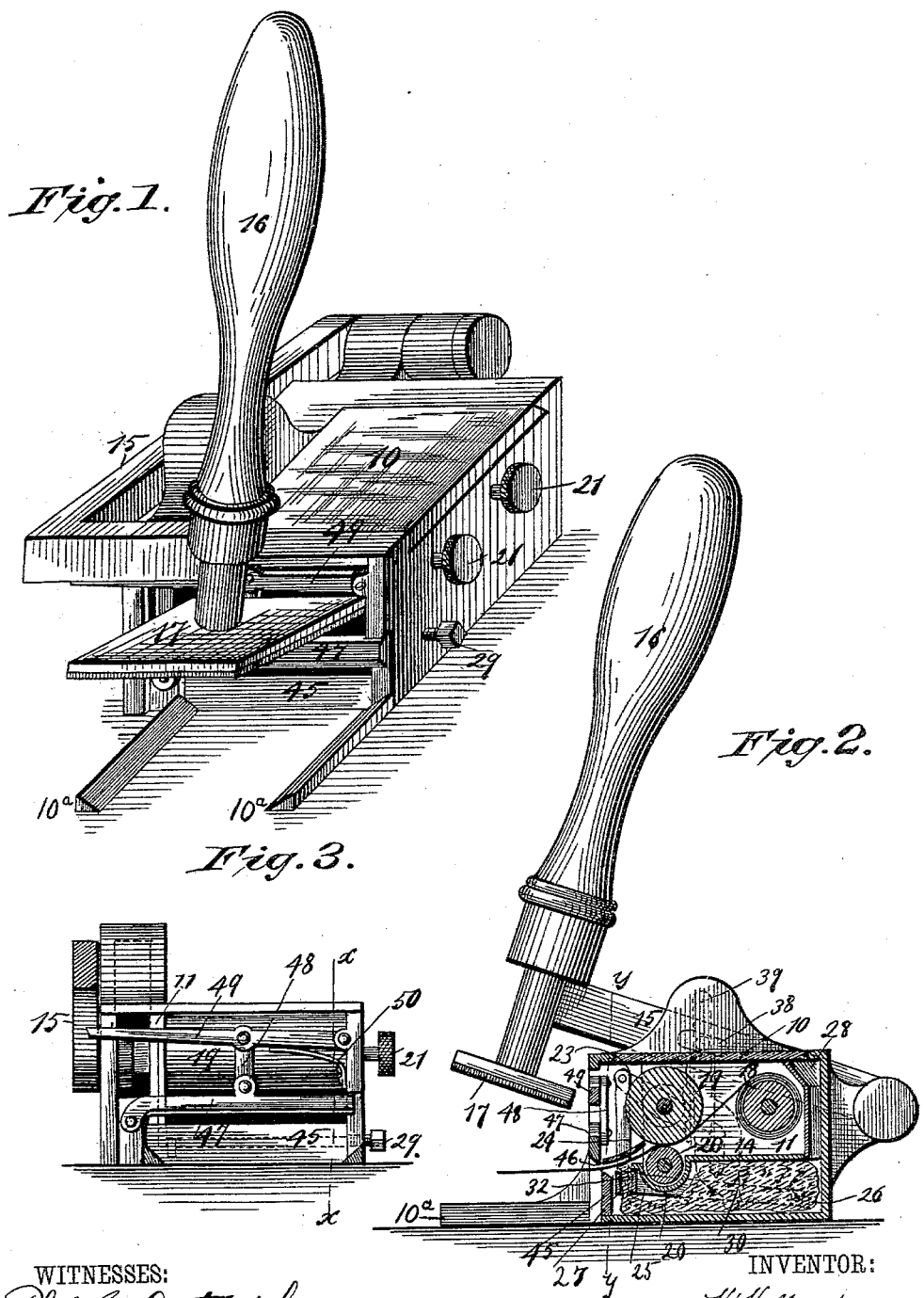

No. 411,593. Patented Sept. 24, 1889.

WITNESSES:
Phil. C. Dieterich.
C. Sedgwick.

INVENTOR:
H. Helland
BY F. Matzow
Munn & Co
ATTORNEYS.

UNITED STATES PATENT OFFICE.

HANS HELLAND AND FRANTZ MATZOW, OF HOUSTON, TEXAS.

APPARATUS FOR STAMPING ENVELOPES.

SPECIFICATION forming part of Letters Patent No. 411,593, dated September 24, 1889.

Application filed February 28, 1888. Serial No. 265,627. (No model.)

*To all whom it may concern:*

Be it known that we, HANS HELLAND and FRANTZ MATZOW, of Houston, in the county of Harris and State of Texas, have invented a new and Improved Apparatus for Stamping Envelopes, &c., of which the following is a full, clear, and exact description.

Our invention relates to an apparatus for stamping envelopes, &c., and has for its object to provide a means whereby with one motion a stamp will be supplied from the apparatus, moistened, and placed in position upon a letter, wrapper, or parcel adapted to receive it, and wherein a number of stamps may be consecutively placed when and as desired.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 4:
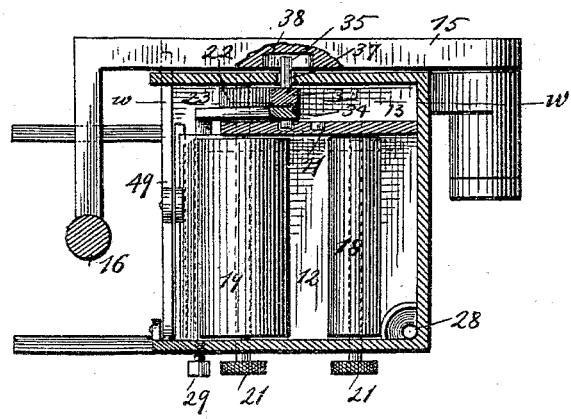
Figure 5:
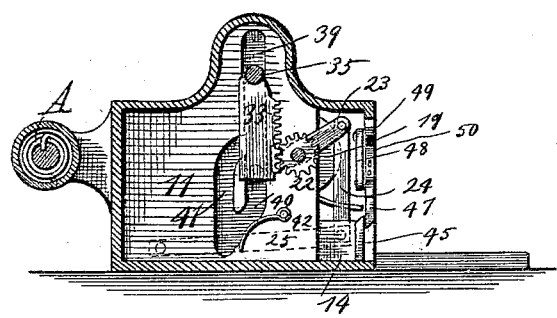
Figure 8:
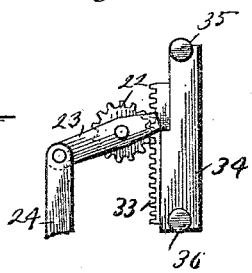
Figure 6:
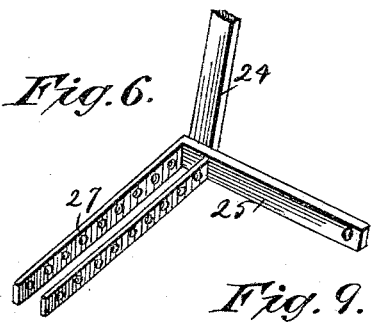

Figure 1 is a perspective view of the device. Fig. 2 is a section on line $x\ x$ of Fig. 3. Fig. 3 is a section on line $y\ y$ of Fig. 2. Fig. 4 is a horizontal section. Fig. 5 is a section on line $w\ w$ of Fig. 4; and Figs. 6, 7, 8, and 9 are detail views.

In carrying out the invention a substantially rectangular box is provided, having preferably a detachable glass lid 10, for purposes of observation and supply. The box is further provided with a vertical partition 11 extending from the rear to within a short distance of the front, whereby a large chamber 12 is obtained and a small chamber 13, the chamber 12 being provided with a false bottom 14, opening immediately inside the front wall. To the rear of the chamber 13 a bracket is formed, in which one member of an angle-arm 15 is pivoted. The short arm of the lever extending in front of the box is attached to a perpendicular handle 16, carrying at its extremity a horizontal affixing plate or pad 17, having the under surface preferably covered with an elastic material—such as rubber—the function of the plate being to press the stamp upon the paper. The arm is held normally in an elevated position at the front by a spring A, inserted at the pivotal point in any approved manner. In order that the box may not tilt forward when the handle 16 is forced down, I provide two forwardly-projecting prism-shaped steadying rods or arms $10^a$. The affixing plate or pad passes down between said arms in affixing a stamp, and the inclines serve as guides for said plate. Within the chamber 12, to the rear, a drum 18 is pivoted parallel with the front, adapted to carry the stamps, which are pasted together at the ends or sides, or otherwise made up in long strips, and in front of the stamp-roller two engaging friction-rollers 19 and 20 are journaled, the upper roller being the largest and the lower smaller roller turning in a recess or depression produced in the false bottom 14, the stamps passing from the carrying-roller between the friction guide-rollers. The drums may be turned at pleasure by means of buttons 21, attached to their axles upon the outside of the box. The axle of the larger guide-roller 19 is extended through the partition 11 into the outer wall, and upon this extension in the chamber 13 a pinion 22 is keyed and a balance-rod 23 is loosely mounted, projecting slightly to the rear and quite a distance forward, which forward extension is pivotally united by a connecting-rod 24 with an angular feed-bar 25, located in the chamber 26, formed by the false bottom 14, one member of which feed-bar is pivoted to the wall of said chamber, and the other member, which consists of spaced parallel and apertured strips 27, being adapted to lie normally in a horizontal position parallel with the front and in alignment with the front opening in the said false bottom, as best shown in Fig. 2.

Figure 9:

The chamber 26 is adapted to contain water supplied by a funnel 28, leading thereto and located in one corner of the chamber 12, as illustrated in Fig. 4. A plug 29 is screwed in one wall of the water-chamber, which is removed in filling, as when more than sufficient water is introduced the aperture acts as an overflow. Within the water-chamber a sponge 30 is also placed, partially filling the same, which sponge, as illustrated in Fig. 9, is provided with a neck 31 and a vertical projection 32 from said neck, the latter being adapted for location between the spaced perforated members 27 of the feed-bar 25. The projection 32 of the sponge when wet will swell and enter the perforations in the strips 27, so that when said strips are raised the sponge will not slip therethrough, but be carried up thereby. Thus when the balance-rod is tripped from the rear the apertured member of the feed-bar is elevated, and the neck projection of the sponge carried up through the front opening in the false bottom to a contact with the mucilage side of the stamp, passing out from between the friction guide-rollers.

46 is a shield between the roller 19 and the knife 47, and extending over the space above the sponge projection 32, to guide the stamps to the knives and form a support for the stamp when said sponge projection is thrown up against it.

Figure 7:
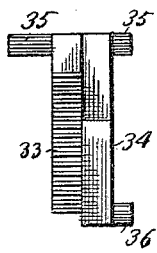

A perpendicular rack 33 is provided, adapted to slide in the chamber 13 and engage with the pinion 22, which rack has attached to its inner smooth face a notched block 34, as shown in detail in Fig. 7, a pintle 35 being made to project from opposite faces of the combined block and rack at the upper end, and likewise a pintle 36 from the lower end of the block only. As the rack in operation engages the pinion, the balance-rod is simultaneously engaged by the lower end of the block and manipulated for the purpose heretofore stated, and released when it reaches the notched portion of the block, as illustrated in detail in Fig. 8.

The pintle projecting from the rack is passed through an oblong slot 37 in the casing into a recess 38 in the angular arm 15, as shown in Fig. 4. This slot 38 is long enough to allow the pintle to move in a chord of a circle. It will thus be observed that the friction guide-rollers are made to pass out a stamp and the sponge to moisten the same simultaneously with the pressing down of the handle, the operation being purposed for completion before the pressing-plate 17 reaches the paper.

The pintles of the notched block 34 are both entered to travel in a slot 39 formed in the partition 11, which slot is provided with two branches 40 and 41, one leading into the other. (More clearly shown in Fig. 5.)

The branch 40 is perpendicular from the top nearly to the bottom, at which point it inclines rearwardly, and a spring 42 is here attached to the partition to guide or force the traveling pintle off of a straight line. The branch 41 of the slot unites with the main branch at the bottom and, extending vertically upward to the rear, again intersects the main branch at or about the center. Thus, in operation, when the rack is brought downward by the pressure of the handle, it is brought in contact with the pinion, which it puts in motion, likewise the guide-roller, as aforesaid, until it passes out of contact with said pinion. The upper pintle of the notched block will still travel in the perpendicular portion of the main branch of the groove. The lower pintle 36 will, however, have reached the inclined plane of the main groove, whereupon the spring 42 will force the pintle into the side branch 41, and the said pintle, running upward by reason of the upward movement of the handle, again enters the main slot. By this means, upon the upward stroke of the handle, the parts remain inactive, the feed-bar simply dropping by gravity again in its normal or horizontal position.

The forward end of the box is substantially open, and at the base a stationary knife 45 is located, over which the stamps pass, as shown in Fig. 2, guided and held in contact with the sponge by a shield 46. A second knife 47 is pivoted at one end to the front of the frame to have a vertical reciprocating motion over the fixed knife to impart a scissor-like cut, as shown in Fig. 3. This movement is effected by a central pivotal connection 48 with a lever 49, pivoted upon the reverse side at the front, near the top of the box. The other end of said lever, projecting through a slot in the box, is engaged by the angle-arm 15 in its descent, depressed, and in turn depressing the pivotal knife. The movements of the parts are so timed as that when the handle is pressed down a single stamp will be fed over the knife, properly moistened, and severed from the strip and laid upon the paper ready to be affixed thereto when the plate 17 strikes the same.

The lever 49 is automatically returned to its normal position, likewise the pivoted knife, by a spring 50, secured to the frame of the box and having a bearing upon the under side of said lever between the pivotal point and the center.

Having thus fully described our invention, we claim as new and desire to secure by Letters Patent—

1. The combination, with an operating-lever carrying an affixing plate or pad, a stamp-carrying roller, and a fixed knife, of guide-rollers, a moistening-sponge, a pivoted frame to which the sponge is connected, a movable knife, and gearing, substantially as described, for operating said guide-rollers, sponge-frame, and movable knife in regular sequence, substantially as and for the purpose specified.

2. In a stamp-affixing machine, the combination, with a receptacle provided with an upper compartment and a lower water-compartment, a stamp-carrying roller, and engaging guide-rollers journaled in the upper compartment, the upper guide-roller provided with a pinion and a balance-rod, of a rack engaging the pinion, a notched block attached to the rack engaging the balance-rod, an angular sponge-carrying frame pivoted in the lower compartment, a connection between said sponge-frame and balance-arm, and an angular arm pivoted to the receptacle provided with an affixing-plate and reciprocating the rack, substantially as and for the purpose herein set forth.

3. In a stamp-affixing machine, the combination, with a receptacle provided with an upper compartment and a lower water-compartment, a stamp-carrying roller, and engaging guide-rollers journaled in the upper compartment, the upper guide-rollers provided with a pinion and a loosely-mounted balance-rod, of an angular arm pivoted to the receptacle provided with an affixing-plate, a rack reciprocated from said arm, a notched block attached to said rack engaging the balance-rod, a sponge-carrying frame pivoted in the water-compartment and connected with said balance-bar, and the knives or cutters in front of the guide-rollers, all arranged to operate in regular sequence, as set forth.

4. In a stamp-affixing machine, the combination, with a roller having strips of stamps wound thereon, of guide-rollers located in front of said stamp-rollers, a frame pivoted below the guide-rollers, and a sponge clamped and carried by said frame, adapted to moisten the stamps when delivered from the guide-rollers, substantially as shown and described.

5. In a stamp-affixing machine, the combination, with a sponge provided with a neck and vertical projection from said neck, of a movable frame adapted to embrace said vertical projection, substantially as shown and described.

6. In a stamp-affixing machine, the combination, with a sponge provided with a neck and a vertical projection from said neck, of a perforated pivoted frame adapted to embrace said neck projection, substantially as and for the purpose specified.

HANS HELLAND.
FRANTZ MATZOW.

Witnesses:
J. C. KIDD,
N. C. MUNGER.